Figure 1:
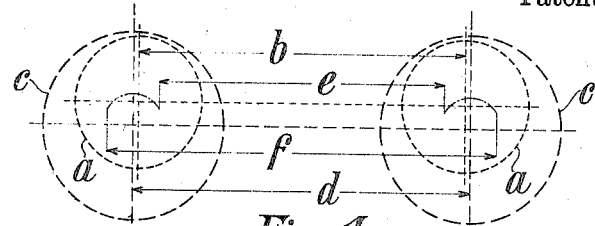

A. KÖNIG.
BINOCULAR TELESCOPE.
APPLICATION FILED MAR. 25, 1909.

947,971.

Patented Feb. 1, 1910.

Witnesses:
Paul Krüger
Richard Hahn

Inventor:
Albert König

UNITED STATES PATENT OFFICE.

ALBERT KÖNIG, OF JENA, GERMANY, ASSIGNOR TO THE FIRM OF CARL ZEISS, OF JENA, GERMANY.

BINOCULAR TELESCOPE.

947,971.  Specification of Letters Patent.  Patented Feb. 1, 1910.

Application filed March 25, 1909. Serial No. 485,798.

*To all whom it may concern:*

Be it known that I, ALBERT KÖNIG, a citizen of the German Empire, and residing at Carl-Zeiss strasse, Jena, in the Grand Duchy of Saxe-Weimar, Germany, have invented a new and useful Binocular Telescope, of which the following is a specification.

The invention consists in an improvement in binocular telescopes in which the two main casings are rigidly connected or formed in one piece and the distance between the oculars can be adapted to the inter-pupillary distance without any optical parts other than the ocular lenses changing their position. In previously constructed binocular telescopes of this kind the means of altering the distance between the oculars consisted in each ocular being shiftable in the direction toward the other in a groove on the common telescope casing, the ocular axis coinciding in a mean position with the axis of the image projected by the objective. In each position of the ocular the foot of the ocular formed as a slide surrounded the opening in the telescope casing corresponding to the ocular, so that this opening was always kept closed by the ocular.

According to the present invention, in binocular telescopes of the above kind, the alteration of the distance between the oculars can be effected by a means which is simpler and correspondingly cheaper and, above all, provides a closure for the ocular openings in the telescope casing, which is more proof, since no parts of its tight fitting surfaces ever remain exposed.

The invention is based substantially on the consideration, that, from an optical point of view, no reason exists for guiding the ocular axes particularly in the plane of the image axes when shifting the oculars, since an equal displacement in height of both axes relatively to the image axes is as admissible as lateral displacements, which have alone hitherto been employed, because they alone fulfil the purpose of adapting the distance between the oculars to the inter-pupillary distance. The object of the invention is obtained by seating each ocular by means of a surface of revolution, which surrounds the ocular eccentrically, in or on a corresponding surface of the casing, which surface surrounds the ocular opening in the casing. Each ocular is thus rotatable about the axis of its eccentric, whereby the distance between the two ocular axes can be changed. If, in altering the distance between the oculars, a symmetrical position of the oculars to the vertical median plane between the image axes be started with, a symmetrical position always results, so long as the oculars be rotated by a like amount in opposite directions. In each of such positions of the oculars the ocular axes have, of course, equal displacement in height relatively to their image axes, and equal but opposite lateral displacement. In rotating each ocular the axis of the ocular describes, in place of the former plane surface, a cylindrical one, which may be so situated, that it again contains the image axis, but besets it more conveniently. The rotatability of the ocular may be restricted to a part of a rotation. In the event of the oculars being movable in ocular tubes for focusing the images, it is advantageous to have these tubes seated eccentrically on the telescope casing. Each ocular can be provided with a device to protect it against accidental displacement in any position desired or at least in each of several positions. It is an advantage to provide such a connection between the oculars, that in each distance between the oculars they lie symmetrically to the vertical median plane between the image axes without any special adjustment.

Figure 2:
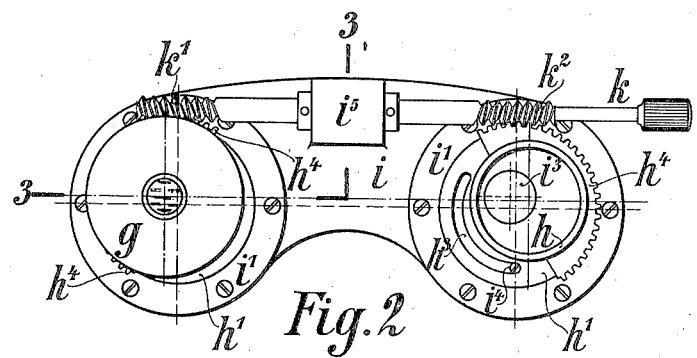
Figure 3:
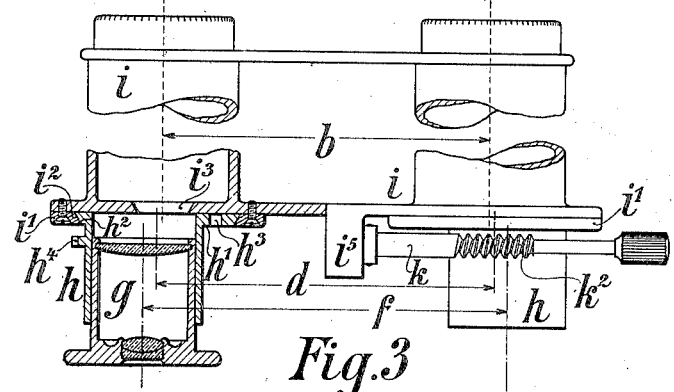
Figure 4:
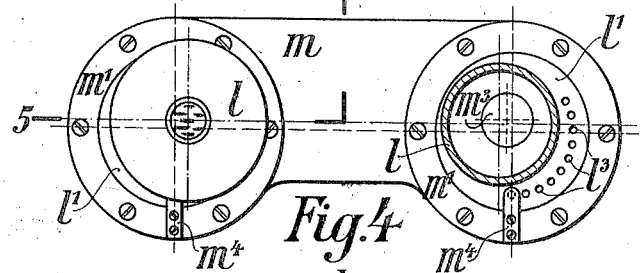
Figure 5:
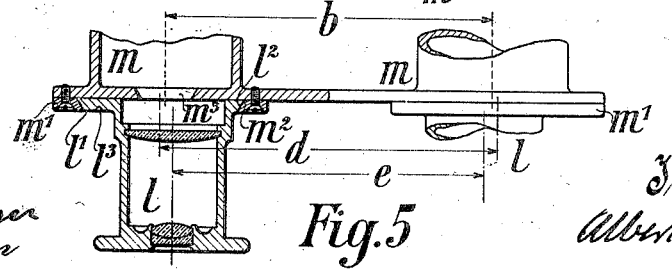

In the annexed drawing: Figure 1 is a diagram of the ocular system according to the invention. Fig. 2 is a front view of a binocular telescope, the right ocular being removed. Fig. 3 is a sectional plan view of parts of the same telescope. Fig. 4 is a front view of another binocular telescope, the right ocular tube being broken away. Fig. 5 is a sectional plan view of parts of the same telescope.

In Fig. 1, the image axes and the diaphragms $a$ of the field of view arranged concentric to them have the fixed distance $b$. The axes of the eccentrics $c$ have a somewhat greater fixed distance $d$. The distance between the ocular axes may be selected as desired between the values $e$ and $f$, the mean value of which is supposed to be equal to $d$, by rotating the oculars about the axes of the eccentrics, whereby the ocular axes describe cylindrical surfaces which appear in the figure as circular arcs. As is evident from the figure, the image axes lie in this arrangement somewhat lower than the ocular axes, when the distance of the latter is a mean one, and somewhat higher than the ocular axes when the distance between the latter has the maximum value $f$ or the minimum $e$.

Referring now to the first example, Figs. 2 and 3, the oculars $g$ are slidable in ocular tubes $h$ for the purpose of focusing the image. Each ocular tube possesses a foot flange $h^1$ and is seated with the latter's conical eccentric surface $h^2$ in an annular part $i^1$ of the telescope casing $i$, which is provided with a corresponding conical surface $i^2$. In the front wall of the casing $i$ there is an opening $i^3$ arranged concentric to the image axis and surrounded by the bearing surface $i^2$, within which opening the image is formed, and the margin of which acts as the diaphragm of the field of view. The rotation of the ocular tube $h$ is limited to about 120° by a slit $h^3$ in the flange $h^1$ of this tube and by a pin $i^4$ screwed into the casing $i$. Each ocular tube $h$ is provided with a worm wheel sector $h^4$ concentric to the axis of the eccentric. The worms $k^1$ and $k^2$, appertaining thereto, with right and left hand thread respectively, are fixed on the driving axle $k$ which is journaled in a projection $i^5$ of the casing $i$.

In the second constructional example, Figs. 4 and 5, it is supposed that parts of the binocular telescope other than the oculars serve for focusing the image. The oculars $l$ are therefore at once provided with a foot flange $l^1$, carrying the eccentric surface $l^2$. The annular parts $m^1$ of the casing $m$ are provided with the eccentric bearing surfaces $m^2$ in the same manner as in the first example. The apertures $m^3$ for the field of view in this case also lie concentric to the image axes and are surrounded by the bearing surfaces $m^2$. Each ocular is rotatable individually, and is for a series of distances between the oculars automatically secured against accidental displacement by the spring pawl $m^4$ and a series of notches $l^3$.

I claim:

In a binocular a casing rigidly connecting both telescopes except the oculars and provided with two ocular openings and two surfaces of revolution, each of which latter surrounds one of the openings eccentrically, and two straight oculars, each with a surface of revolution which surrounds the ocular eccentrically, the oculars being rotatably seated to the casing with their surfaces of revolution fitted to those of the casing.

ALBERT KÖNIG.

Witnesses:
PAUL KRÜGER,
FRITZ SANDER.